United States Patent
Couturier et al.

(10) Patent No.: US 6,504,852 B1
(45) Date of Patent: Jan. 7, 2003

(54) INTELLIGENT GATEWAY BETWEEN A SERVICE CONTROL POINT AND A SIGNALLING NETWORK

(75) Inventors: Alban Couturier, Paris (FR); Laurent-Philippe Anquetil, Paris (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/228,684

(22) Filed: Jan. 12, 1999

(30) Foreign Application Priority Data

Jan. 15, 1998 (FR) .......................................... 98 00348

(51) Int. Cl.$^7$ ................................................. H04J 3/16
(52) U.S. Cl. ....................... 370/467; 370/466; 370/469; 370/496; 370/401; 370/376; 370/486; 709/220; 709/223; 709/229; 709/318
(58) Field of Search ................................. 370/465–467, 370/469, 486, 376, 401, 496; 709/220, 223, 229, 318

(56) References Cited

U.S. PATENT DOCUMENTS

| | | | | | |
|---|---|---|---|---|---|
| 5,774,695 | A | * | 6/1998 | Autrey ........................ | 395/500 |
| 5,793,771 | A | * | 8/1998 | Darland et al. .............. | 370/467 |
| 5,940,827 | A | * | 8/1999 | Hapner et al. ................. | 707/8 |
| 5,987,118 | A | * | 11/1999 | Dickerman et al. .......... | 379/265 |
| 6,061,729 | A | * | 5/2000 | Nightingale ................ | 709/228 |
| 6,229,819 | B1 | * | 5/2001 | Darland et al. .............. | 370/467 |
| 6,349,342 | B1 | * | 2/2002 | Menges et al. ............. | 709/316 |
| 6,363,421 | B2 | * | 3/2002 | Barker et al. ................ | 709/223 |

OTHER PUBLICATIONS

Kwang–Jae Joeng et al, "Effective Overload Prevention and Control for Traffic Management in Intelligent Network", Proceedings of the 4$^{th}$ International Conference on Intelligence in Networks—ICIN 96, Nov. 25–28, 1996, Bordeaux, France, pp. 229–234 XP002067129.

M. Sevcik et al, "Customers and Driver's Seat: Private Intelligent Network Control Point", Proceedings of the International Switching Symposium, ISS '95, Paper P. Y6, vol. 2, Apr. 23–28, 1995, Berlin (DE), pp. 41–44, XP000495622.

P.S. Budihardjo et al, "Achieving SS7 Network Efficiency Through Node Integration", Global Telecommunications Conference, Tokyo, Nov. 15–18, 1987, vol. 3, Nov. 15, 1987, Institute of Electrical and Electronics Engineers, pp. 1570–1577, XP002026014.

C. Buckles, "Very high capacity signaling transfer point for intelligent network services", IEEE International Conference on Communications—Paper 40.2, vol. 3, Jun. 12–15, 1988, Philadelphia, pp. 1–4, XP000012083.

"Transparent Message Routing Between an SS#7 Network and X.25 Network", IBM Technical Disclosure Bulletin, vol. 35, No. 3, Aug. 1, 1992, pp. 434–436, XP000326333.

* cited by examiner

Primary Examiner—Douglas Olms
Assistant Examiner—Van Nguyen
(74) Attorney, Agent, or Firm—Sughrue Mion, PLLC

(57) ABSTRACT

A gateway between a first data network and a second data network enables translation of messages in accordance with a first protocol specific to the first data network into messages conforming to a second protocol specific to the second data network. The second data network includes software applications and the gateway includes a registration software entity. Messages coming from or going to a particular one of the software applications are processed by a representative software entity contained in the gateway and each new software application made available on the second data network causes the determination of the representative software entity at the registration software entity.

13 Claims, 2 Drawing Sheets

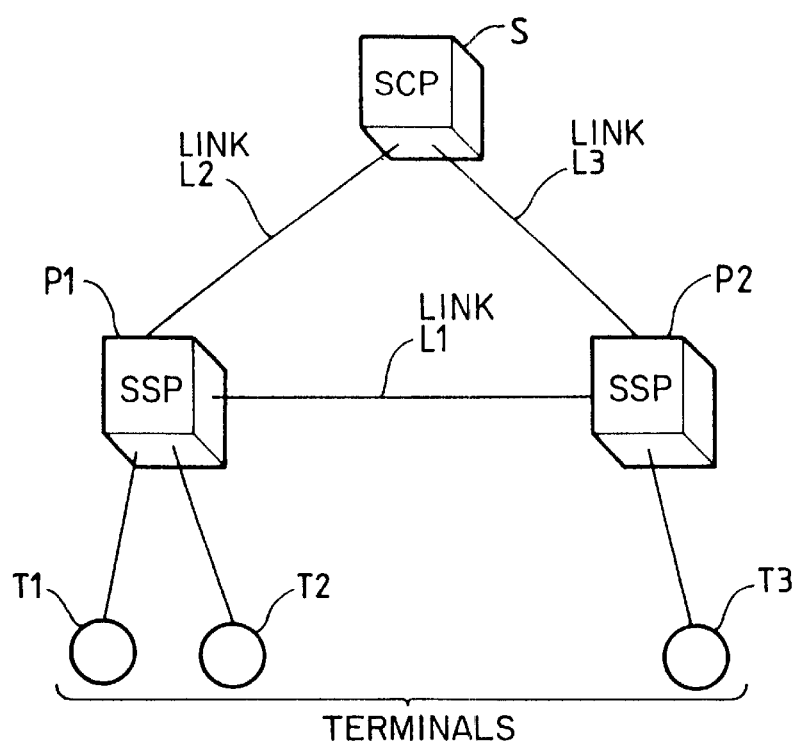
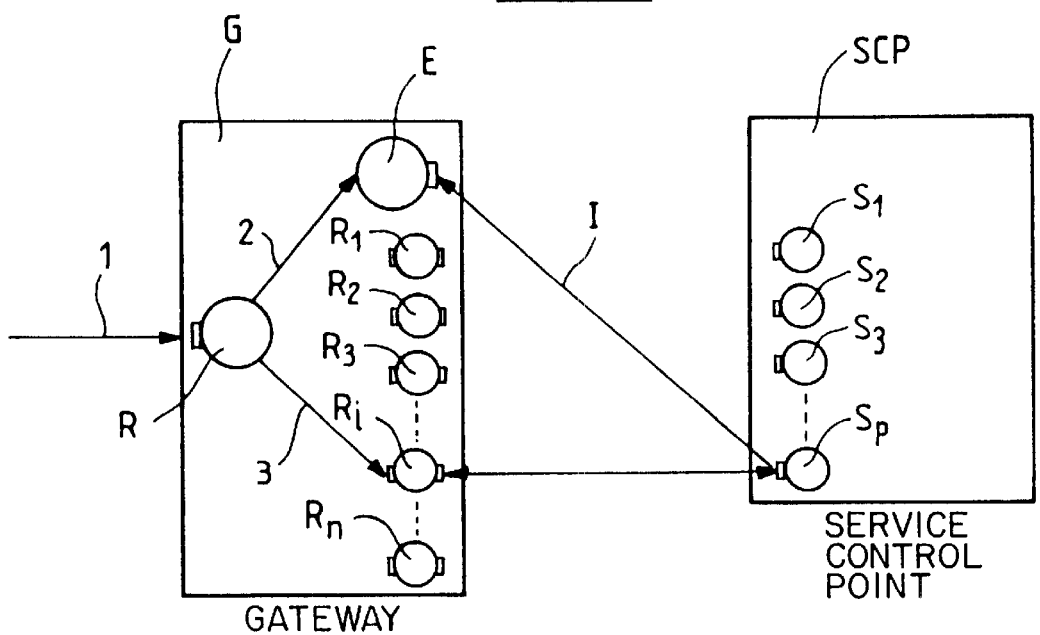

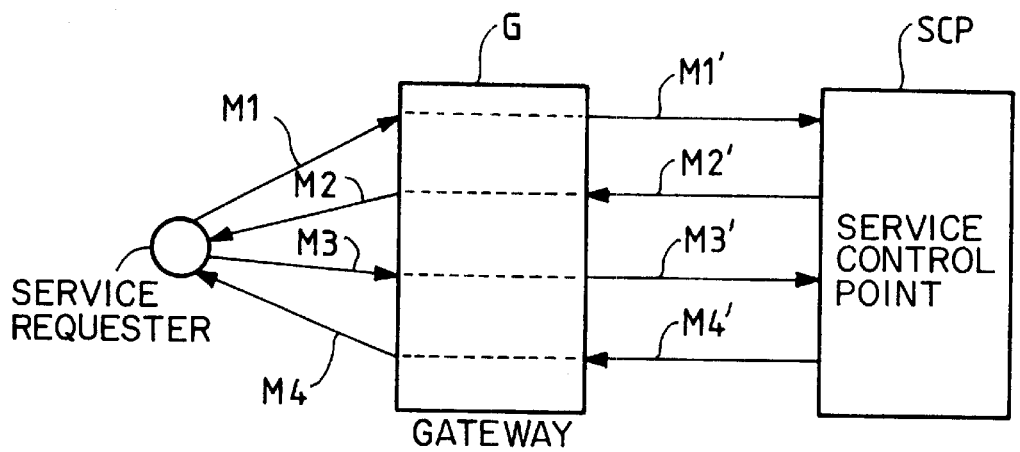
FIG_3
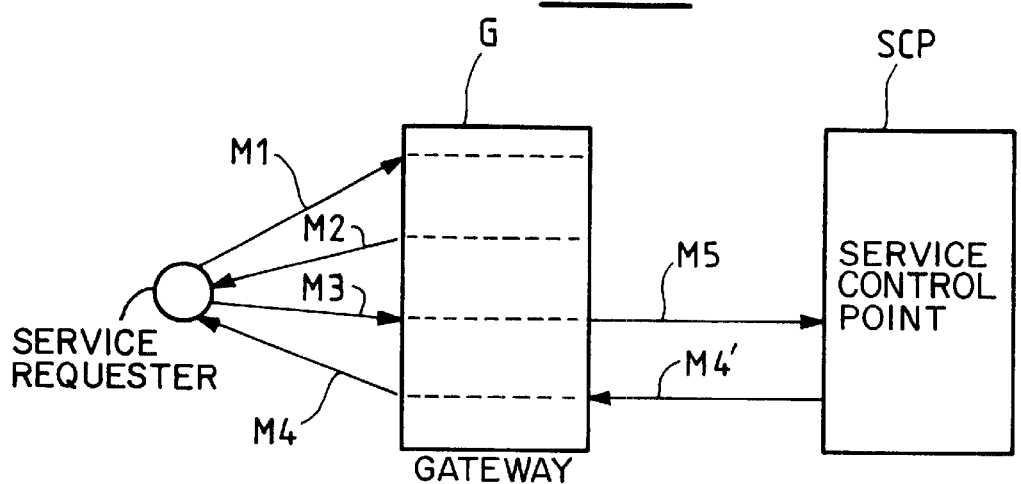
FIG_4

INTELLIGENT GATEWAY BETWEEN A SERVICE CONTROL POINT AND A SIGNALLING NETWORK

BACKGROUND OF THE INVENTION

1. Field of the Invention

The present invention concerns a gateway connected to two data networks capable of intelligent translation between two communication protocols, at least one of the two data networks including software applications.

The invention applies in particular to translating messages between messages from a signaling network and messages from an object-oriented distributed environment, conforming to, for example, the TINA (Telecommunication Intelligent Network Architecture) specifications.

2. Description of the Prior Art

Gateways usually translate incoming messages directly into outgoing messages, i.e. the gateways do not interpret the messages in any way.

This type of gateway generally generates at least as many outgoing messages as it receives incoming messages. Given that the software applications are distributed across a network, this verbosity leads to congestion of the network and an overall reduction of system performance.

The aim of the present invention is to propose a gateway for reducing the number of outgoing messages. This reduction is achieved by delegating some of the processing effected by the applications directly to the level of the gateway.

SUMMARY OF THE INVENTION

The invention consists in a gateway between a first data network and a second data network enabling translation of messages in accordance with a first protocol specific to said first data network into messages conforming to a second protocol specific to said second data network, said second data network including software applications, and said gateway including a registration software entity, wherein messages coming from or going to a particular one of said software applications are processed by a representative software entity contained in said gateway and each new software application made available on said second data network causes the determination of said representative software entity at said registration software entity.

In a first embodiment of the invention the code of the representative software entities is transmitted to the gateway.

This can be object code that can be executed directly by the gateway.

It can instead be source code (for example Java code) that can be interpreted by the gateway, which includes the necessary interpreter (for example a Java virtual machine).

In a second embodiment the gateway has a set of representative software entities. Each new application made available then chooses one representative software entity from the set.

The sending of the code or the choice of the representative software entity can be handled by the software application itself or by an administrator.

The representative software entity can be created as and when required, i.e. each time a translation is requested.

Another embodiment entails creating the representative software entity when the software application is registered with the gateway (via the registration means). The advantage of this embodiment is that it minimizes the number of creations (and deletions) of software entities, these creations being relatively costly for a data processing system.

Other advantages and features of the invention will become more clearly apparent in the following description of an application of the invention to intelligent networks, given with reference to the accompanying drawings.

BRIEF DESCRIPTION OF THE DRAWINGS

FIG. 1 is a diagram showing the general architecture of a telecommunication network.

FIG. 2 shows the gateway of the invention in the context of an application to intelligent networks.

FIG. 3 represents a dialogue between a service requester and an SCP, using a prior art gateway.

FIG. 4 shows the same dialogue using a gateway of the invention.

DETAILED DESCRIPTION OF THE PREFERRED EMBODIMENT

An intelligent network can be defined as a service-independent telecommunication network. In other words, the services offered by the system are not implemented on the entities of the transport network (exchanges, etc), as was the case in conventional networks, but on data processing systems connected to the network. This independence of services from the transport network enables greater flexibility in managing the system formed in this way.

To be more precise, in an intelligent network, services are managed by data processing systems connected to databases. This combination is called a Service Control Point (SCP). The data processing system managing a particular SCP can be either a single computer or a network of computers.

In the terminology specific to intelligent networks, the telecommunication network switches are known as Service Switching Points (SSP).

The accompanying FIG. 1 shows one example of an intelligent network architecture. Terminals T1, T2 and T3 are connected to two SSP P1 and P2. The terminals represent the users of the telecommunication network. The data specific to the call (data, fax, etc) is transmitted on the link L1.

The entities L1, T1, T2, T3, P1 and P2 represent the transport network.

The SCP and the SSP are interconnected by a signalling network separate from the telecommunication network proper.

In the example illustrated by FIG. 1, the SSP P1 and P2 are connected to an SCP S by the links L2 and L3. These links and the SCP form the signalling network.

The interface between the signalling network and the telecommunication network proper consists entirely of the SSP.

A conventional set of protocols for signalling networks is Signalling System number 7 (SS7) defined by the Q.700 through Q.783 series recommendations of the ITU-T (International Telecommunication Union—Telecommunication Standardization Sector) and by the documents "SS7 ITU-T standards 1988, Blue Book" and "SS7 ITU-T standards 1992, White Book".

SS7 is a stack of protocols covering the lowest level to the highest levels, i.e. those corresponding to layer 7 of the OSI (Open System Interconnection) standard of the ISO (International Standards Organization).

The TINA (Telecommunication Intelligent Network Architecture) consortium has proposed a more precise architecture for software applications providing services in the context of intelligent networks.

In the remainder of this description the expressions "software application" and "service" are used interchangeably.

The services, which are localized at the SCP, must be developed in a Distributed Processing Environment (DPE). The DPE employed is typically the CORBA (Common Object Request Broker Architecture) proposed by the OMG (Open Management Group). CORBA enables communication between different programs independently of the underlying data processing architectures and the programming languages used.

Consequently, the SCP receives from the SSP messages that conform to the SS7 standards but the service requires messages conforming to the DPE specifications, in particular the CORBA specifications.

To be more precise, the messages received by the SCP can conform to the INAP (Intelligent Network Application Protocol) which is above the TCAP layer in the SS7 protocol stack. The INAP is defined by the ITU-T Q.12xx series recommendations.

The prior art gateways currently available provide simple translation, i.e. each INAP message is translated directly into one or more CORBA messages, and vice versa, without any interpretation by the gateway.

Because the SCP can be implemented in a distributed environment, there can be a large number of CORBA messages in both directions between the SCP and the gateway.

Intelligent translation can dispense with a large number of these messages. This results in a saving in terms of the bandwidth of the network on which the SCP is implemented and consequently improved performance.

FIG. 2 shows the gateway G of the invention. It includes a software entity R for receiving INAP messages. This software entity can include a system of queues for managing arriving messages dynamically and asynchronously.

The gateway also includes a software entity E for registering new services at the SCP and for routing correctly INAP messages reaching the software entity R.

The gateway includes software entities $R_1$ through $R_n$ (referred to as representatives hereinafter) the aim of which is intelligent translation of INAP messages to CORBA messages and vice versa.

In accordance with the invention, some of the processing effected by the service is relocated to the gateway G, at the level of the representatives $R_1$ through $R_n$.

These are typically simple processes such as authentication of the service requester, for example.

In the prior art this authentication conventionally requires a dialogue between the SCP and the service requester, each message of this dialogue having to be translated from one protocol to another.

In accordance with the invention, the dialogue can be handled by the representative of the service. This saves many translations that were necessary with a prior art gateway.

Because it is highly dependent on the service, there is more than one way to effect intelligent translation. Thus a plurality of representatives can be made available, each service on the SCP choosing the appropriate representative.

The SCP includes one or more services $S_1$ through $S_p$ (FIG. 2).

When a new service $S_p$ is created it sends to the address of the software entity E a registration of initialization message I which indicates the representative that the service will use thereafter ($R_i$ in the example shown in the figure).

In a first embodiment this representative $R_i$ is initially present on the gateway. This covers the possibility of the representative being created dynamically at the request of the service $S_i$, the data necessary for it to be created dynamically being present at the gateway in any event.

This embodiment represents the situation in which the gateway is supplied with a set of predetermined representatives.

Given that, regardless of their number, the set of representatives can never cover all of the possibilities that may prove necessary, it is prudent to propose within this set a subset of non-intelligent representatives, i.e. representatives that effect translation in accordance with the prior art. These representatives therefore translate an INAP message into a CORBA message and vice versa.

These representatives can be chosen by default when no other representative is suitable.

A second embodiment consists in transmitting dynamically from the new service created $S_p$ to the gateway G, for example during registration, the data needed to create the corresponding representative $R_i$. This can be migrant object code, for example Java code.

This embodiment requires the developer of a new server for the intelligent network to develop also the appropriate representative.

After the step in which the new service $S_p$ registers with the software entity E, each new INAP message (1) addressed to it is received by the software entity R and then transmitted (2) to the software entity E responsible for registration. The latter verifies if there is a service corresponding to the message previously registered with it. As this is the case here, the message is transmitted to the appropriate representative $R_i$ which is able to process the message correctly.

The detailed implementation of the registration process will not be described further because it will be evident to the skilled person. For example, the gateway G can include a correspondence table for establishing the relationship between the identifiers of services present on the SCP and the corresponding representatives.

FIGS. 3 and 4 show an example of the start of conversation between a service requester (D) and a service control point (SCP). They show the authentication of the service requester with the SCP. FIG. 3 shows the mechanism using a prior art gateway and FIG. 4 shows the same mechanism using a gateway of the present invention.

Referring to FIG. 3, a request 1 to access the service emanating from the requester D reaches the gateway G where it is translated and then transmitted (message M1') to the SCP.

The SCP responds (message M2') with an identification request. The request is translated by the gateway G and then transmitted (M2) to the requester.

The requester then sends their identification (M3) which is translated by the gateway G and sent (M3') to the SCP.

Finally, the SCP sends a message allowing access to the service (M4') which is translated and sent (M4) to the requester.

Referring to FIG. 4, the requester sends a request to access the service (M1). The request is processed by the gateway G (to be more precise by the representative software entity of the service concerned), which sends the requester an identification request (M2).

The requester then sends their identification (M3) which causes transmission to the SCP of a message M5 containing the request to access the service with the identification of the requester.

As previously indicated, the SCP sends a message M4' allowing access to the service which is translated by the gateway into a message M4 that is sent to the requester.

Comparing the dialogue using a prior art gateway and the dialogue using a gateway in accordance with the invention it can be seen that the number of calls between the gateway and the SCP has been halved.

This implementation for translating INAP messages into CORBA messages can be transposed directly to other pairs of protocols.

For example, the first protocol can conform to ITU-T recommendation X.88x, corresponding to ISO standard 13712-1 and entitled ROS (Remote Operation Service).

The first protocol could equally conform to the MAP (Mobile Application Protocol) or TCAP (Transaction Capabilities Application Part) protocol respectively defined by ITU-T recommendations of series Q.7xx and X.77x.

In the same way the second protocol can conform to another distributed architecture, whether object-oriented or not.

There is claimed:

1. A gateway between a first data network and a second data network enabling translation of messages in accordance with a first protocol specific to said first data network into messages conforming to a second protocol specific to said second data network, said second data network including software applications, and said gateway including a registration software entity, wherein messages coming from or going to a particular one of said software applications are processed by a representative software entity that corresponds to said particular one of said software applications and is contained in said gateway and each new software application made available on said second data network causes the determination of said representative software entity or another representative software entity, at said registration software entity.

2. The gateway claimed in claim 1, wherein said determination comprises transmitting data related to said representative software entity or said another representative software entity.

3. The gateway claimed in claim 1, wherein said determination comprises choosing said representative software entity or said another representative software entity from a set of representative software entities present at said gateway and possibly transmitting a set of parameters to said representative software entity or said another representative software entity.

4. The gateway claimed in claim 1 wherein said determination is effected by said new software application.

5. The gateway claimed in claim 1 wherein said determination is effected by administration means.

6. The gateway claimed in claim 1, wherein said determination causes a creation of said another representative software entity.

7. The gateway claimed in claim 1 wherein said first data network is an SS7 signalling network.

8. The gateway claimed in claim 1 wherein said first protocol is an ROS protocol.

9. The gateway claimed in claim 7 wherein said first protocol is a TCAP.

10. The gateway claimed in claim 7 wherein said protocol is an INAP or MAP.

11. The gateway claimed in claim 1 wherein said second protocol is a protocol for communication between distributed objects.

12. The gateway claimed in claim 11 wherein said protocol conforms to the CORBA specifications.

13. A gateway between a first data network and a second data network enabling translation of messages in accordance with a first protocol specific to said first data network into messages conforming to a second protocol specific to said second data network, said second data network including software applications, and said gateway including a registration software entity, said gateway comprising:

means for processing said software applications, wherein messages coming from or going to a particular one of said software applications are processed by said means for processing said software applications which corresponds to said particular one of said software applications; and means for determining said representative software entity or another representative software entity, based on each new software application made available in said second data network.

* * * * *